M. D. COMPTON.
MECHANICAL MOVEMENT.
APPLICATION FILED APR. 16, 1913.

1,123,172.

Patented Dec. 29, 1914.

WITNESSES:
Rob't R Kitchel
Frank E French

INVENTOR
Melvin D. Compton
BY
Augustus B. Stoughton.
ATTORNEY.

UNITED STATES PATENT OFFICE.

MELVIN D. COMPTON, OF NEW YORK, N. Y.

MECHANICAL MOVEMENT.

1,123,172.  Specification of Letters Patent.  Patented Dec. 29, 1914.

Application filed April 16, 1913. Serial No. 761,469.

*To all whom it may concern:*

Be it known that I, MELVIN D. COMPTON, a citizen of the United States, residing at New York, in the county of New York and State of New York, have invented certain new and useful Improvements in Mechanical Movements, of which the following is a specification.

The principal object of the present invention is to provide a mechanical movement for transforming reciprocatory and rotary motions which shall involve in its construction a comparatively small number of parts and which shall be comparatively simple and inexpensive to build, compact and reliable in operation and which shall be useful in connection with so-called self-starters for internal explosion or combustion engines as well as for other purposes.

The invention will be claimed at the end hereof but will be first described in connection with the embodiment chosen from among other embodiments of it for illustration in the accompanying drawings in which—

Figure 1:
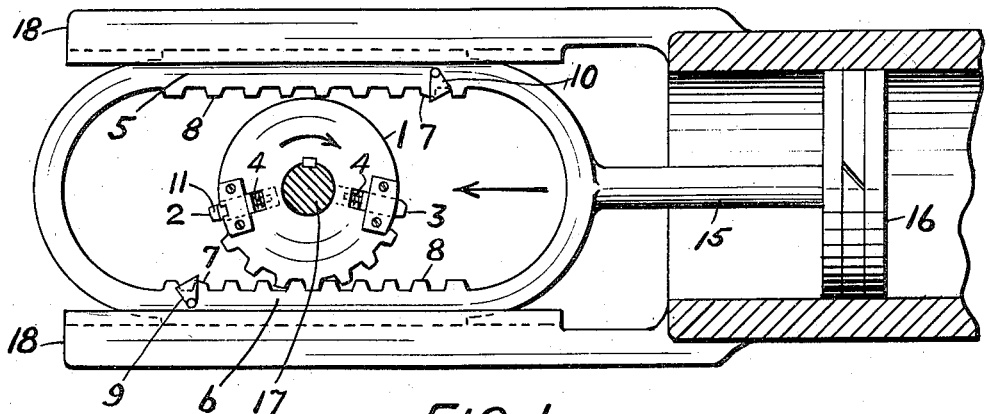
Figure 2:
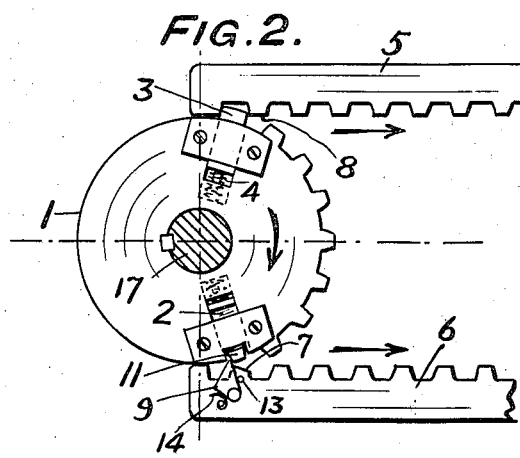
Figure 3:
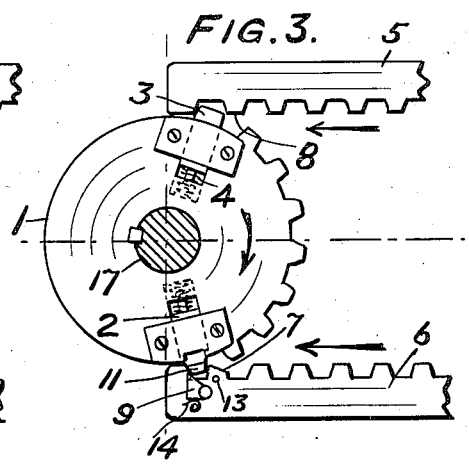
Figure 4:
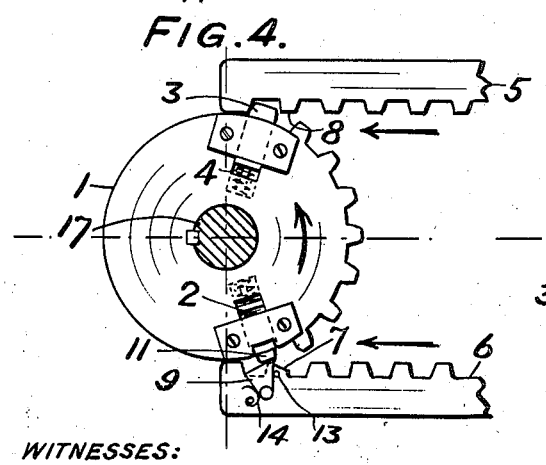
Figure 5:
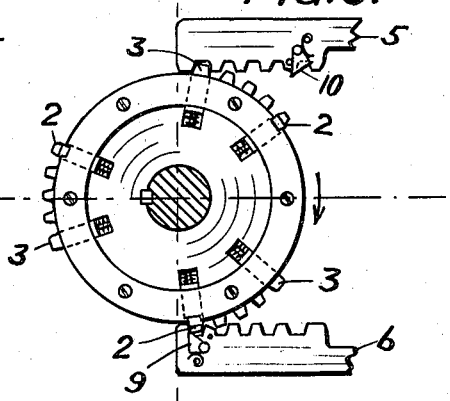

Figure 1, is a side view, partly in section and somewhat diagrammatic in character, illustrating a mechanical movement embodying features of the invention. Figs. 2—4, inclusive are side views, partly in section, illustrating different positions of the parts, and Fig. 5, is a similar view illustrating a modification.

In the drawings, Figs. 1—4, 1, is a rotary segmental gear and it is provided with plunger teeth 2 and 3. The ends of these plunger teeth are normally held up beyond the pitch circle as by springs 4, but the teeth are capable of receding below the pitch line radially toward the center with a sliding motion. There is a pair of duplicate reciprocating racks 5 and 6, and these are provided with rigid teeth. The rack teeth next to the end teeth operate on the ends of the plunger teeth and recede them. 9 and 10, are oppositely disposed movable dogs on the racks and these coöperate with a plunger tooth or more accurately with a projection 11, extending laterally therefrom. These dogs are pivoted at 12, and are provided with a back stop 13, and with a spring 14.

So as to explain the mode of operation, the mechanical movement will be considered in application to a self-starter although the invention is not limited to that use, while at the same time that use is a very important one. The racks 5 and 6, are connected with a rod 15, of the piston 16, which is reciprocated as by compressed air. The segmental gear is appropriately connected with the engine shaft or with some part 17, connected with the engine shaft. As shown in Fig. 1, the racks are moving toward the left guided, of course, in suitable parallel fixed ways 18. Under these circumstances the rack 6, is driving the gear 1, in clockwise direction and the rack 5, does not engage any teeth on the gear 1.

Referring to Fig. 2, the rack 5, is doing the driving and is near the end of its stroke. The plunger tooth 3, at the top, is shown as wider than the other teeth and is in engagement with the extreme lefthand space of the rack 5. This space is shown as wider than the other spaces. The plunger tooth 2, shown at the bottom in Fig. 2, is on the end of one tooth 7, of the next to the end teeth of the rack which has receded it. For this purpose there is a bevel or cam surface between the ends of the plunger and rack tooth 7. In the present instance the bevel happens to be shown on rack tooth but it may be transferred to the plunger teeth, this being a mere transfer not involving invention. At the beginning of the lefthand stroke, Fig. 3, the plunger tooth 2, has passed over the tooth 7, and is being driven by it. The end of the plunger tooth 3, will be operated upon by the end of the second tooth 8, of the rack 5, which recedes the tooth 3, to clear the gear 1, so that the latter is continuously turned clockwise. In Fig. 3, the dog 9, is shown as turned to one side away from its back stop 13, by the projection 11, on the plunger tooth 2. Thus the gear is turned in the same direction, being driven first by one rack and then by the other and the plunger teeth permit this to be accomplished while insuring that at least one tooth on the gear is always in engagement with one tooth on one or the other of the racks, but never are teeth on the gear engaged by teeth on both racks at the same time, as that would tend to lock the device. If by reason of what is known as a kick or flash-back the gear 1, should be driven in counter-clockwise direction, as indicated in Fig. 4, it would drive the racks causing compression on the piston 16, but when the racks get to the end of the stroke the dog 9, held by its back stop 13, would recede the plunger tooth, as at the bottom of Fig. 4; thus freeing the gear from the rack 6, and letting it operate on the rack 5.

The construction and mode of operation of the modification shown in Fig. 5, are as has been described except that the segmental gear has three groups of teeth instead of one, each group of teeth and each rack being exactly as has been described in connection with Figs. 1—4. Thus it appears that more than one group of teeth may be employed with the result that the stroke of the racks may be shortened and the movement made compact.

I do not intend to limit the invention to details of construction and arrangement for they may be varied, as is evident to those skilled in the art, but

Having thus described my invention, what I claim as new and desire to secure by Letters Patent is:

1. A mechanical movement comprising the combination of a rotary segmental gear provided with end plunger teeth, and a pair of reciprocatory racks having at opposite ends the next to the end teeth arranged for receding the plunger teeth, there being a beveled face between said plunger and the next to the end rack teeth, whereby reciprocation of the racks is accompanied with continuous rotation of the gear in the same direction.

2. A mechanical movement comprising the combination of a rotary segmental gear provided with end plunger teeth, a pair of reciprocatory racks having oppositely disposed teeth arranged next to the end teeth of the rack for receding the plunger teeth, and oppositely disposed movable dogs arranged on the racks and coöperating with the plunger teeth to recede them when the segmental gear is driven backward.

In testimony whereof I have hereunto signed my name in the presence of.

MELVIN D. COMPTON.

Witnesses:
S. E. PATTERSON,
FRANK E. FRENCH.